United States Patent
Ellrich et al.

(10) Patent No.: US 8,337,945 B2
(45) Date of Patent: Dec. 25, 2012

(54) METHOD FOR PRODUCING AN ELEMENT, INCLUDING A MULTIPLICITY OF NANOCYLINDERS ON A SUBSTRATE

(75) Inventors: Jens Ellrich, Wiesbaden (DE); Lei Yong, Karlsruhe (DE); Horst Hahn, Seeheim-Jugenheim (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 780 days.

(21) Appl. No.: 12/300,557

(22) PCT Filed: Apr. 28, 2007

(86) PCT No.: PCT/EP2007/003792
§ 371 (c)(1),
(2), (4) Date: Nov. 12, 2008

(87) PCT Pub. No.: WO2007/131617
PCT Pub. Date: Nov. 22, 2007

(65) Prior Publication Data
US 2009/0263595 A1    Oct. 22, 2009

(30) Foreign Application Priority Data
May 11, 2006 (DE) .......... 10 2006 021 940

(51) Int. Cl.
*C23C 16/40* (2006.01)
*B05D 5/12* (2006.01)

(52) U.S. Cl. ............... 427/126.4; 427/128; 427/130; 427/131; 427/255.31; 427/255.34; 117/89

(58) Field of Classification Search ............ 427/255.31, 427/255.34, 128, 130, 131, 126.4; 117/89
See application file for complete search history.

(56) References Cited

U.S. PATENT DOCUMENTS

| | | | |
|---|---|---|---|
| 6,717,777 B2 | 4/2004 | Den et al. | |
| 6,829,159 B2 | 12/2004 | Den et al. | |
| 6,906,368 B2 | 6/2005 | Ito et al. | |
| 2002/0055239 A1 | 5/2002 | Tuominen et al. | |
| 2002/0145826 A1 | 10/2002 | Zangari et al. | |
| 2002/0158342 A1 | 10/2002 | Tuominen et al. | |
| 2004/0115898 A1* | 6/2004 | Moghadam et al. | 438/435 |
| 2005/0037374 A1* | 2/2005 | Melker et al. | 435/6 |
| 2005/0199886 A1* | 9/2005 | Yi et al. | 257/79 |
| 2005/0277205 A1* | 12/2005 | Lee et al. | 436/526 |
| 2006/0057354 A1* | 3/2006 | Kalkan et al. | 428/304.4 |
| 2006/0091408 A1* | 5/2006 | Kim et al. | 257/94 |

OTHER PUBLICATIONS

Mativetsky, J.M., et al., "Properties of alumina membrane-templated polypyrrole nanostructures". Solid State Communications 122 (2002) 151-154.*
Huang, Y.H., et al., "CoPt and FePt nanowires by electrodeposition". Journal of Applied Physics, vol. 91, No. 10, May 15, 2002, pp. 6869-6871.*
Y. H. Huang et al. "CoPt and FePt nanowires by electrodeposition", Journal of Applied Physics, New York, US, vol. 91, No. 10, May 15, 2002, pp. 6869-6871, XP001112511.
Yong Lei et al. "Shape and Size Control of Regularly Arrayed Nanodots Fabricated Using Ultrathin Alumina Masks", Chemistry of Materials, vol. 17, Jan. 13, 2005, pp. 580-585, XP002448823.
Jianyu Liang et al. "Two-dimensional lateral superlattices of nanostructures: Nonlithographic formation by anodic membrane template", Journal of Applied Physics, American Instutite of Physics, New York, US, vol. 91, No. 4, Feb. 15, 2002, pp. 2544-2546, XP001124585.
D. Halley et al. "L10 ordering at different stages of Fe0.5Pd0.5 epitaxial growth", Journal of Applied Physics, American Institute of Physics, New York, US, vol. 91, No. 12, Jun. 15, 2002, pp. 9757-9763, XP012055493.
Takeshi Ohgai et al.: "Electrochemical synthesis and magnetoresistance properties of Ni, Co and Co/cu nanowires in a nanoporous anodic oxide layer on metallic aluminium". Journal of Materials Chemistry, 2003, 13, pp. 2530-2534.
L. Piraux et al.: "Gigant magnetoresistance in magnetic multilayered nanowires". Appl. Phys. Lett. 65, pp. 2484-2486, Nov. 7, 1994, American Insititute of Physics.
X.-T. Tanga et al.: "Perpendicular giant magnetoresistance of electrodeposided Co/Cu-multilayered nanowires in porous alumina templates". Journal of Applied Physics 99, 033906 (2006), American Institute of Physics.
A. Fert et al.: "Magnetic nanowires". Journal of Magetism and Magnetic Materials 200, pp. 338-358 (1999), Elsevier Science B.V.
Kröll et al. "Magnetic Properties of Ferromagnetic Nanowires Embedded in Nanoporous Alumina Membranes", Journal of Magnetism and Magnetic Materials 249, 2002, pp. 241-245.
S. Kavita et al. "Preparation of Fe/Pt Films with Perpendicular Magnetic Anisotropy", Hyperfine Interactions 160, 2005, pp. 157-163.

* cited by examiner

Primary Examiner — Bret Chen
(74) Attorney, Agent, or Firm — Leydig, Voit & Mayer, Ltd.

(57) ABSTRACT

A method for producing an element including a substrate having a plurality of nanocylinders deposited thereon includes providing the substrate. The substrate is covered with a nanoporous $Al_2O_3$ membrane so as to provide a covered substrate. The covered substrate is alternately vapor-deposited, at a vapor-deposition temperatures from 250° C. to 400° C., with atoms of a magnetic element and atoms of a non-magnetic element so as to provide the plurality of nanocylinders. Each nanocylinder includes at least four superposed layers including, alternatively, the atoms of the magnetic element and the atoms of the non-magnetic element. The nanoporous $Al_2O_3$ membrane is then removed so that the nanocylinders remain on the substrate.

10 Claims, No Drawings

METHOD FOR PRODUCING AN ELEMENT, INCLUDING A MULTIPLICITY OF NANOCYLINDERS ON A SUBSTRATE

CROSS REFERENCE TO RELATED APPLICATIONS

This is a U.S. National Phase application under 35 U.S.C. §371 of International Application No. PCT/EP2007/003792, filed on Apr. 28, 2007, and claims the benefit of German Patent Application No. 10 2006 021 940.6, filed on May 11, 2006. The International Application was published in German on Nov. 22, 2007 as WO 2007/131617 A1 under PCT Article 221(2).

FIELD

The present invention relates to a method for producing an element, which includes a substrate onto which a multiplicity of nanocylinders are deposited, and to a method of using thereof as a magnetic storage medium, switching element or sensor.

BACKGROUND

Thin alloy films of metallic components on suitable substrates are used as magnetic storage media, switching elements or as sensors, in the case of storage applications, critical importance being placed on the orientation of the magnetic moments relative to the layer surface.

The bit storage size can be reduced by reducing the magnetic volume in which the information is stored. However, such a reduction inevitably results in a loss of thermal stability of the stored information (superparamagnetic limit, thermal excitation of remagnetization processes above a characteristic temperature), thereby limiting the storage density that is attainable at the present time.

By selecting appropriate classes of material and by employing patterning methods, it is possible to significantly increase the storage density. This requires using systems which exhibit a perpendicular magnetocrystalline anisotropy. At the present time, ternary material combinations, such as Co—Cr—Pt, which necessitate costly production methods to introduce the same, as well as a thermal treatment, are used for this purpose.

Yong Lei and Wai-Kin Chim, *Shape and Size Control of Regularly Arrayed Nanodots Fabricated Using Ultrathin Alumina Masks,* Chem. Mater. 2005, 17, pp. 580-585, describe the production of highly ordered semiconductor and metallic structures from nanoparticles having controllable sizes and shapes. These structures are deposited via nanoporous membranes of $Al_2O_3$, which are also described as ultrathin alumina masks or UTAMs, onto Si and Si/$SiO_2$ substrates. The size and shape of the structures can be controlled by the aspect ratio of the apertures of the traversing pores of these membranes, as well as by the quantity of material. These masks can also be used at higher temperatures for epitaxial growth. It has been possible up until now to employ this method to fabricate ordered structures of semiconductive nanoparticles having sizes of up to 20 nm.

In *Magnetic Properties of Ferromagnetic Nanowires Embedded in Nanoporous Alumina Membranes,* Journal of Magnetism and Magnetic Materials 249 (2002), pp. 241-245, M. Kröll, W. J. Blau, D. Grandjean, R. E. Benfield, F. Luis, P. M. Paulus and L. J. de Jongh describe producing iron, nickel and cobalt nanowires from $Al_2O_3$ using nanoporous membranes. These nanowires can be adjusted in diameter (5-250 nm) and length (up to a few hundred micrometers).

In *Preparation of Fe/Pt Films with Perpendicular Magnetic Anisotropy,* Hyperfine Interactions (2005) 160, pp. 157-163, S. Kavita, V. R. Reddy, A. Gupta and M. Gupta describe the structures and magnetic properties of $L1_0$ ordered, thin equiatomic FePt films, which were produced by ion beam sputtering and subsequent annealing.

US 2002/0158342 A1 describes an element which includes a substrate onto which a multiplicity of nanocylinders are deposited, each nanocylinder having superposed layers alternately composed of atoms of a magnetic element and of a non-magnetic element. The element is fabricated using a diblock copolymer, upon which a metal layer is at least partially deposited, which, following orientation and removal of one component of the diblock copolymer, forms nanocylinders.

However, selected binary alloy systems, such as the Fe—Pt, Fe—Au or Co—Pt system, can likewise exhibit the desired properties. In the case of material synthesis preferably carried out by vapor deposition processes, kinetic inhibition prevents the ordering of the desired $L1_0$ phase having perpendicular magnetocrystalline anisotropy from being effectively controlled. Rather, the system crystallizes at room temperature in the disordered fcc phase, accompanied by random filling of the lattice sites. However, the desired orientation can be controlled by applying suitable vapor deposition parameters. As a result, material combinations can be artificially produced which do not provide a thermodynamically stable configuration for the $L1_0$ order. An example of this is the deposition of Fe and Au in monolayers.

SUMMARY

An aspect of the present invention is to provide a method for producing an element of this kind and to provide a method of using thereof that will address the aforementioned disadvantages and limitations. It is intended, in particular, that this method makes it possible to produce an element that exhibits an advantageous, lateral ordering of the structures, accompanied by adequate decoupling of the individual structural elements, that has a large-area array within the range of a few $cm^2$, that exhibits a virtually perpendicular magnetic anisotropy, and that features a preferably monodisperse distribution of the structure sizes, the structure size being on the order of approximately 10 nm.

In an embodiment, the present invention provides a method for producing an element including a substrate having a plurality of nanocylinders deposited thereon. The method includes providing the substrate. The substrate is covered with a nanoporous $Al_2O_3$ membrane so as to provide a covered substrate. The covered substrate is alternately vapor-deposited, at a vapor-deposition temperatures from 250° C. to 400° C., with atoms of a magnetic element and atoms of a non-magnetic element so as to provide the plurality of nanocylinders. Each nanocylinder includes at least four superposed layers including, alternatively, the atoms of the magnetic element and the atoms of the non-magnetic element. The nanoporous $Al_2O_3$ membrane is removed so that the nanocylinders remain on the substrate.

DETAILED DESCRIPTION

Method step a) provides for first preparing a substrate, which is selected in accordance with the following criteria: All materials are suited as substrate materials, provided that they belong to one of the following two classes of material:

amorphous systems, such as glass, for example, which are preferably suited for Fe—Pd, as well as Fe—Au; and crystalline systems having a suitable lattice constant for mediating the growth of the MX films in that growth direction which makes possible a perpendicular orientation of the magnetization. Especially suited for FePt are MgO(001), GaAs (001) or SrTiO$_3$ (001).

The substrate is subsequently covered with a nanoporous membrane of Al$_2$O$_3$ in accordance with method step b), the diameter, the interspacing and the configuration of the pores in the Al$_2$O$_3$ membrane being selected in accordance with the parameters desired for the nanocylinders.

In the subsequent method step c), one or a plurality of atomic layers of atoms M of a magnetic element and atoms X of a non-magnetic element are alternately deposited onto the substrate that is covered with the nanoporous membrane until the desired value is reached for the height of the nanocylinders and the number of layers. The atoms are preferably deposited using an electron beam vaporizer (molecular beam epitaxy). The moderate vapor-deposition temperatures required therefor within the range of 250° C. to 400° C. render possible a virtually complete ordering of the deposited layers. Layers produced in this manner exhibit a virtually perfect L1$_0$ ordering.

Finally, in accordance with method step d), the Al$_2$O$_3$ membrane is preferably removed from the surface of the substrate using a solvent suited for this purpose, such as water or alcohol, so that, instead of the pores of the membrane, nanocylinders remain on the substrate.

An element produced using the method according to the present invention is composed of a substrate onto which a multiplicity of nanocylinders, also referred to as nanodots, nanospots or nanocolumns, are deposited. In this case, each nanocylinder has four, five, six, seven, eight, nine, ten, eleven, twelve or more superposed layers. The layers, which make up the nanocylinders, are alternately composed in this case of atoms of a magnetic element M and of a non-magnetic element X.

In an embodiment, M=Fe, Co or Ni are selected as atoms of a magnetic element and X=Pd, Pt, Rh or Au as atoms of a non-magnetic element. Examples include the combinations Fe—Pt, Fe—Au, Co—Pt, Co—Au, Co—Ni and Co—Pd.

Each layer can include 1 to 10 atomic layers. For example, each layer can have the same number of atomic layers as those layers which are adjacent-but-one thereto.

The number and thickness of the layers can influence the magnetic properties of the nanocylinders. Thus, the L1$_0$-ordered phase in the Fe—Pt system can be characterized by alternating atomic layers of Fe and Pt, and can also exhibits a very high coercive field strength due to the exceptionally high magnetocrystalline anisotropy. However, this effect can necessitate very high remagnetization field strengths (>500 mT) for a remagnetization in storage media that are difficult to apply to structure sizes on the order of a few nanometers.

The reason for this exceptional magnetocrystalline anisotropy might be the strong interaction between Fe and Pt atoms. However, this polarization may be utilized to control the coercive field strength. To this end, the thickness of the Fe layer can be varied. For example, when two Fe monolayers are used, the coercive field strength can be significantly reduced to practicable ranges (250 mT) and can be accompanied by an unvarying stability of the stored information in response to external fields and thermal excitation. By properly selecting the layer thicknesses and the vapor-deposition parameters, it can be possible to adjust a coercive field strength of 50-1000 mT. The upper limit can be defined by the saturation magnetization of a completely ordered layer. A desired secondary effect of such a structure is the tilting of the magnetization vector by approximately 15° out of the layer plane. This tilting renders possible a simplified remagnetization process and a greater readout security when the element according to the present invention is used as a magnetic storage medium.

The nanocylinders can have a diameter of 10 nm to 100 nm, for example 20 nm to 50 nm, and an interspacing of 10 nm to 100 nm, for example 20 nm to 50 nm. The nanocylinders can be configured in the form of a two-dimensional cubic or hexagonal structure on the substrate. The lateral structure sizes are set by the diameter, the interspacings and the configuration of the pores in the Al$_2$O$_3$ membrane.

Moreover, the nanocylinders can have a height of 2 to 500 nm, for example of 5 nm to 100 nm. The desired height value for the nanocylinders can be set by varying the deposited quantity of material within this broad range.

The elements produced using the method according to the present invention can be used as magnetic storage media, switching elements or as sensors.

In particular, the present invention has the advantages delineated in the following.

The use of self-ordered, nanoporous Al$_2$O$_3$ masks makes it possible for the Fe—Pt nanocylinders produced to attain a high level of perfection. Once the masks are removed from the substrate, highly ordered arrays of L1$_0$-ordered Fe—Pt nanocylinders remain having a diameter which is dependent on the diameter of the pores in the Al$_2$O$_3$ masks used. This was verified by AFM (atomic force microscope) investigations which detected L1$_0$-ordered Fe—Pt nanocylinders having a diameter of 15-50 nm. A further reduction in the diameter of the Fe—Pt nanocylinders may be effected by a further optimization of the Al$_2$O$_3$ masks.

Under known methods heretofore, a large-area array of nanocylinders was able to be obtained over an area of approximately 500×500 μm$^2$. Arrays on the order of a few cm$^2$ may be produced by further optimizing the masks.

Perpendicular anisotropy is a property of the L1$_0$ phase in the Fe—Pt system. Virtually any given orientation of the magnetization vector may be set as a function of the selected production conditions (vapor deposition rates, substrate temperature and layer thicknesses). A perpendicular orientation of the magnetization can be established by depth-selective Mössbauer spectroscopy (determination of the magnetic properties on an atomic level) and by SQUID measurements (characterization of remagnetization processes).

The present invention is explained in greater detail in the following with reference to exemplary embodiments.

To produce an element (array) of Fe—Pt nanocylinders in accordance with the present invention, substrates were prepared from MgO(001) monocrystals. Prior to deposition of the layers, the substrates were each provided with a nanoporous Al$_2$O$_3$ mask. The pore size was 20 nm, the average interspacing of the pores, 25 nm.

Subsequently thereto, Fe or Pt atoms (purity in each case better than 99.95%) were deposited on the substrates by molecular beam epitaxy at defined substrate temperatures.

The substrate temperature and thus the deposition temperature were able to be adjusted through the use of a heating filament. The spacing between the material sources and the substrate was approximately 0.3 m. To achieve an ordered L1$_0$ phase, the layers were deposited at a deposition temperature of 350° C. at deposition rates of 0.3 nm/min (Fe), respectively 0.01 nm/min (Pt). The total layer thickness was approximately 4 nm. To carry out a deposition by atomic layers, the specimen holder and the material sources were each provided with a shutter, which was closed each time upon reaching the desired layer thickness. For deposition of the second element, the shutter in question was opened, and the respective element was deposited.

Following deposition of the layers and cooling of the substrate in ambient atmosphere, the nanoporous $Al_2O_3$ mask was removed by rinsing with water or alcohol (isopropanol).

For the examples presented here, two iron monolayers and two platinum monolayers were successively vapor-deposited onto substrates of MgO (001) monocrystals until, altogether, eight or twelve superposed layers, alternately composed of two iron monolayers and of two platinum monolayers, were deposited.

The elements of FePt nanocylinders produced in accordance with the present invention exhibit a perpendicular magnetization orientation for all produced particle diameters (25 nm, 50 nm), accompanied by a slight tilting of approximately 10° to 20° from the layer normal. Higher growth temperatures may be used to achieve a complete orientation and thus to fully control the ordering of the layered system. However, a slight tilting is advantageous for a use as a storage medium, since, on the one hand, the high magnetocrystalline anisotropy makes it possible to store the desired information, and on the other hand, however, desired remagnetization processes may be facilitated by external fields, for example in the writing head.

The invention claimed is:

1. Method for producing an element including a substrate having a plurality of nanocylinders deposited thereon, the method comprising:
   providing the substrate;
   covering the substrate with a nanoporous $Al_2O_3$ membrane so as to provide a covered substrate;
   alternately vapor-depositing, at vapor-deposition temperatures from 250° C. to 400 ° C., the covered substrate with atoms of a magnetic element and atoms of a non-magnetic element so as to provide alternating superposed layers of the atoms of the magnetic element and the atoms of the nonmagnetic element that form the plurality of nanocylinders, each of the nanocylinders including at least four of the superposed layers, each of the superposed layers having from 1 to 10 atomic layers; and
   removing the nanoporous $Al_2O_3$ membrane so as to provide the substrate of the element including the nanocylinders deposited on the substrate,
   wherein the element includes at least one of a magnetic storage medium, a switching element and a sensor.

2. The method recited in claim 1, wherein the magnetic element is at least one of Fe, Co and Ni and the non-magnetic element is at least one of Pd, Pt, Rh and Au.

3. The method recited in claim 2, wherein the magnetic element is Fe and the non-magnetic element is Pt.

4. The method recited in claim 1, wherein the vapor deposition is performed so that each layer has a same number of atomic layers as an adjacent-but-one layer.

5. The method recited in claim 1, wherein the nanocylinders have a diameter of from 10 nm to 100 nm and a height of from 2 to 100 nm.

6. The method recited in claim 1, wherein the nanocylinders have an interspacing of from 10 nm to 100 nm.

7. The method recited in claim 1, wherein the nanocylinders are disposed in a cubic or hexagonal structure on the substrate.

8. The method recited in claim 1, wherein the vapor depositing is performed using an electron beam vaporizer.

9. The method recited in claim 1, wherein the removing is performed by dissolving the nanoporous $Al_2O_3$ membrane from the substrate using a solvent.

10. The method recited in claim 1, wherein the removing is performed so that the nanocylinders remain, instead of pores of the nanoporous $Al_2O_3$ membrane, on the substrate.

* * * * *